United States Patent Office 3,434,807
Patented Mar. 25, 1969

3,434,807
REACTOR WITH HEAT EXCHANGER
Guenther Ibing, Gildenstr. 57, Gladbeck, Germany; Hermann Schirrmacher, Horster Str. 522; Herbert Vollmer, Horster Str. 524; and Josef Boemelburg, Horster Str. 526, all of Bottrop, Germany; and Fritz Schwall, Heierbusch 20, Essen-Bredeney, Germany
Filed July 20, 1967, Ser. No. 655,726
Claims priority, application Germany, July 21, 1966, St 25,670
Int. Cl. B01j 9/04; F28f 13/06; F28d 15/00
U.S. Cl. 23—288                          9 Claims

ABSTRACT OF THE DISCLOSURE

A housing defines an inner chamber having an inlet and outlet for a first heat exchange medium. A circulating tube with a fan is arranged centrally of the chamber for circulating the first medium therein. A plurality of pipes are disposed in the chamber and carry a second heat exchange medium. The pipes are arranged in a plurality of groups adjacent ones of which define with one another unobstructed passages for the first medium. Conduit means is arranged in one of the passages and connects the circulating tube with the inlet and the outlet, respectively.

Background of the invention

The present invention relates generally to a reactor, and more particularly to a catalytic reactor. Still more particularly, the present invention relates to a reactor for exothermal and endothermal reactions.

The processes involved in exothermal and endothermal catalytic reactions are well known. Examples of exothermal reactions, which are by no means intended to be exhaustive, are the Fischer-Tropsch synthesis, the conversion of sulfur dioxide into sulfur trioxide, and others. To carry out these reactive processes the catalyzer passes through a plurality of tubes which are disposed in the actual oven or reactor vessel. These tubes are exposed to a flowing heat exchange medium which is intended to impart or remove heat for the purpose of maintaining the optimal reaction temperature. Various different heat exchange media are suitable for this purpose and the utilization of the particular medium employed depends largely on the required reaction temperature. If a heat exchange medium is used which remains liquid at the required reaction temperature, that is which does not boil at this temperature, then a medium is used which has a low as possible a vapor pressure. It has been found that anorganic salt solutions, for instance a mixture of kalium nitrate and natrium nitrite, are very well suited for this purpose.

Regardless of what type of heat exchange medium is used, however, it is necessary that the heat exchange intensity be as identical as possible throughout the entire cross section of the chamber, that is at all points of all of the tubes which carry the catalyzer.

A reactor which is suitable for exothermic reactions is known from the prior art and is connected with a source of cooling medium with inlet and outlet conduits. The heat exchange medium is conveyed by a conduit secured to the wall of the reactor housing in the upper region thereof into the separate cooling device, and upon being cooled to the necessary extent it is returned into the lower region of the reactor through several conduits so that it can again rise in the reactor and, having been heated by contact with the catalyzer-containing pipes, be recirculated to the cooling device. The several inlet conduits which connect the cooling device with the lower region of the reactor communicate with the latter at preferably equidistantly spaced circumferential points, and from the respective points of communication tunnel-shaped guide baffles extend to the center of the chamber for distributing the heat exchanging medium substantially uniformly throughout the cross section of the chamber.

This construction, known from the prior art, is generally satisfactory for the purposes at hand. However, it necessitates a relatively complicated construction because there are several inlet conduits all of which are of different length. Furthermore, the larger the circumference of the reactor housing is, the more of these inlet conduits are necessary in order to obtain proper distribution of the heat exchange medium within the chamber. Evidently, this will not only necessitate a relatively extensive use of materials, thus raising the cost of constructing the reactor; rather, this solution frequently encounters space problems because the many tubes and conduits involved are frequently difficult to accommodate. Furthermore, it must be remembered that all these tubes must be well insulated for preventing freezing of the heat exchange medium during short periods of inactivity of the reactor.

It is obvious, from what has just been said, that improvements in this field are highly desirable.

Summary of the invention

The present invention overcomes the aforementioned disadvantages.

More particulary, the present invention provides a reactor in which only two very short conduits are necessary to connect the reactor to an externally located heat exchange unit, such as a cooling device for cooling the heat exchange medium.

The construction of my novel reactor is simple and requires only a relatively minor departure from the construction for instance of the earlier-mentioned prior-art reactor, so that utilization of the present invention does not necessitate significant changing of production method, retraining of personnel, or the like.

Despite the fact that the required differences are relatively minor, the present reactor is, however, considerably simpler and more compact than prior-art reactors of this type.

In accordance with one feature of our invention, we provide a catalytic reactor which comprises a housing defining an inner chamber having an inlet and an outlet for a first heat-exchange medium. Circulating means is arranged centrally of the chamber and is operative for circulating the first medium therethrough. A plurality of pipes are disposed within the chamber so as to be exposed to the first medium. These pipes are adapted to convey the second heat exchange medium through the chamber, namely the catalyzer. The pipes are so arranged as to define a plurality of groups which are adjacent to one another, with adjacent ones of these groups defining with one another unobstructed passages through which the first medium cam flow. Finally, our novel reactor also comprises conduit means which is arranged in one of these passages and which connects the inlet and the outlet both with the circulating means. Thus, fresh first medium which enters the inlet from the externally located heat exchanger, namely the cooling device or the like, is conveyed by the conduit means to the circulating means for circulating through the chamber into heat exchanging contact with the pipes. Conversely, spent first medium is conveyed by the conduit means from the circulating means to the outlet to be returned to the externally located heat exchanger. Because the reactor and the heat exchanger are connected only by the two very short conduits which constitute the conduit means, they can be insulated together and can thus be united at any time and at any place, for instance by having the conduit means welded thereto, into what in effect constitutes a single unitary structure.

To effect regulation of the amount of heat to be supplied or to be removed we can either provide suitable means for continuously varying the operative heat exchanging area of the pipes, or by varying the quantity of incoming or outgoing first heat exchange medium. In case of an exothermal reaction in which the reaction heat is to be used for producing steam, it has heretofore been customary to dispose the cooling device, namely the heat exchanger for cooling the heat exchanging medium directly in the reactor. The regulation of the heat exchange function was accomplished by regulating the amount of water supplied which was completely converted into steam. In accordance with the present construction, the much-improved regulating possibilties just mentioned make it possible to convert only a portion of the water into steam which in turn makes it feasible to use water of considerably less purity than that which is necessary where the entire quantity of water is converted into steam. This also is obviously in advantage over the prior art.

The novel features which are considered as characteristic for the invention are set forth, in particular, in the appended claims. The invention itself, however, both as to its construction and its method of operation, together with additional objects and advantages thereof, will be best understood from the following description of specific embodiments when read in connection with the accompanying drawing.

*Description of the preferred embodiments*

Figure 1:
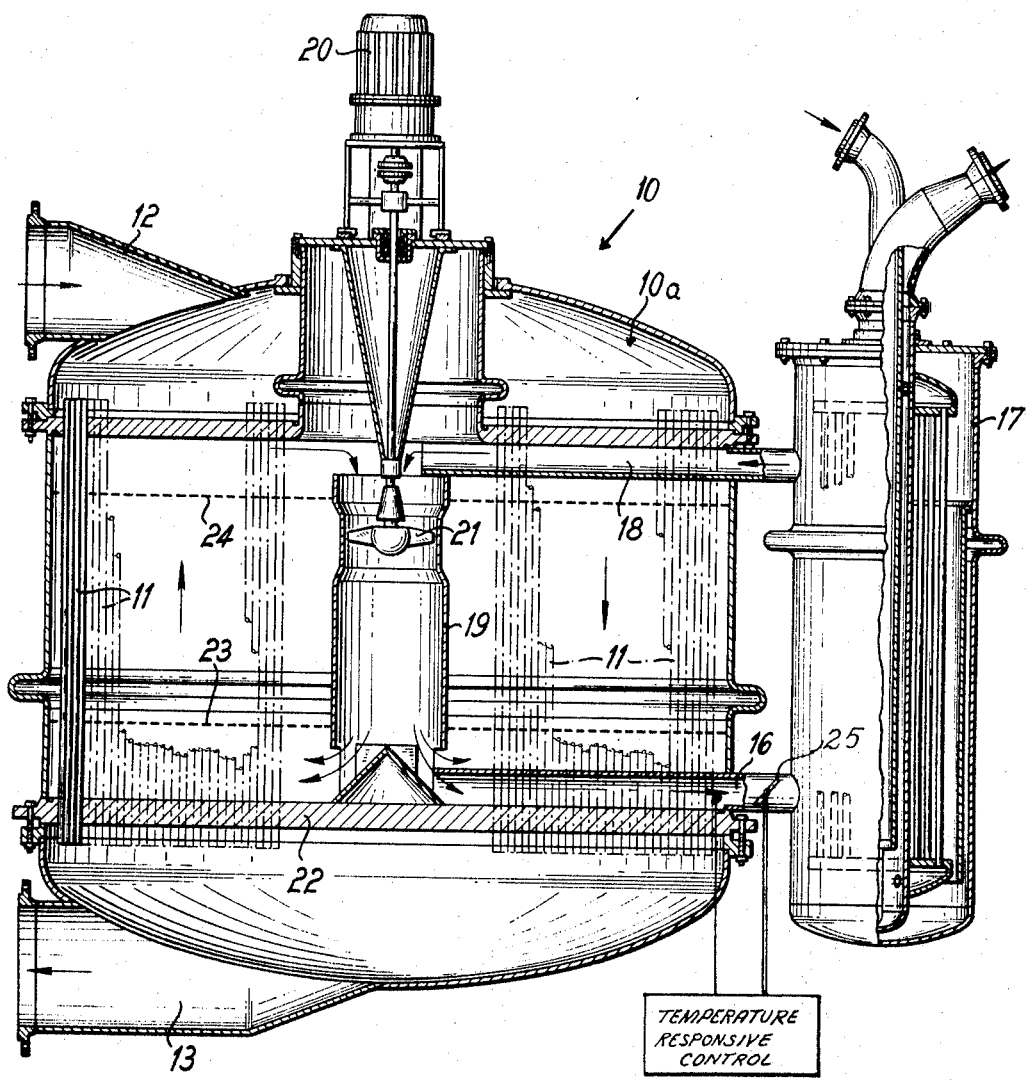
FIG. 1 is a vertical section through a reactor embodying our invention.

Discussing now the drawing in detail, it will be seen that the novel reactor is generally indicated with reference numeral 1. It defines an internal chamber 10a which in the illustrated embodiment is upright and within which is arranged a plurality of pipes 11 each of which is filled with catalyzer, namely a first heat-exchanging medium as it may be broadly expressed. The pipes 11 are connected with the inlet conduit 12 through which they are supplied with the catalyzer, and with the outlet conduit 13 through which the catalyzer leaves the reactor. Thus, the flow pattern of the catalyzer is from the top to the bottom of the chamber 10a. It will be understood, of course, that it is the reaction product which leaves the chamber 10a through the outlet conduit or pipe 13.

Figure 2:
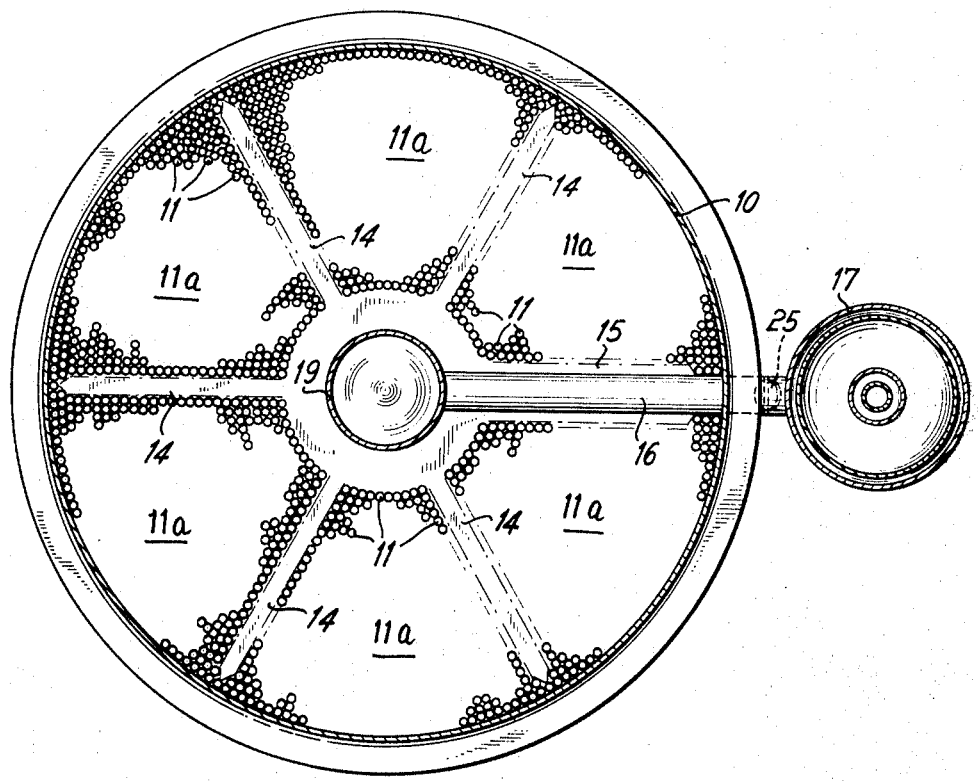
FIG. 2 is a horizontal section through the embodiment illustrated in FIG. 1.

FIG. 2 in particular indicates that the pipes 11, of which only some are shown as representative of all the others, are arranged in substantially wedge-shaped groups 11a adjacent ones of which define between themselves the unobstructed free passages 14 which extend from the top of the bottom of the chamber 10a. Thus, the tube system—by which is meant the totality of all of the pipes 11 in the chamber 10a—is divided into a plurality of sectors or groups of substantially identical size.

In accordance with the invention, one of the passages identified in FIG. 2 with reference numeral 15, is somewhat broader than the other passages 14. Arranged within the passage 15 is an outlet conduit 16 which connects the chamber 10a with the heat exchanger 17 which is located adjacent to the reactor 10, as clearly evident from FIGS. 1 and 2, and with an inlet conduit 18 which connects the heat exchanger with the chamber 10a.

A guide tube or baffle 19 is disposed substantially centrally within the chamber 10a, as shown in FIG. 2 in particular, and arranged within this tube 19 is an impeller 21 which is driven by a suitable drive means, for instance by electromotor 20, shown in FIG. 1. The action of the impeller 21 is such that it circulates the first heat exchanging medium, which enters the chamber 10a through the conduit 18, downwardly in the tube 19 which the medium leaves at the bottom end of the tube, as indicated by the arrow shown in FIG. 1. The major portion of the thus-circulated medium, for instance approximately 90%, thus flows into the space between the pipe bottom 22 and a perforate lower circular baffle 23 and is distributed evenly over the entire cross section of the chamber 10a via the passages 14, 15 and the baffle 23. This major portion of the first heat exchange medium then rises in the chamber 10a, contacting all of the pipes 11 in heat exchanging engagement, and after passing through the perforate upper circular baffle 24 (compare FIG. 1) is drawn back into the guide tube 19 by the action of the impeller 21. The remainder of the heat exchange medium, that is 10% if the major portion is assumed to be 90%, leaves the guide tube 19 and passes from there into the outlet conduit 16 from where it enters the externally arranged heat exchanger 17 to be heated or cooled. Having undergone one of these processes in the heat exchanger 17, these 10% of the first heat exchanging medium are returned into the chamber 10a, or more particularly into the guide tube 19, through the inlet conduit 18 which, as clearly evident from FIG. 1, communicates with the upper end of the guide tube 19. Entering the upper end of the guide tube 19 this fresh heat-exchange medium is admixed with the spent heat exchange medium which has circulated upwardly through the baffle 24, as a result of the action of the impeller 21, and again moves downwardly to be subdivided into a major and a minor stream as already indicated earlier.

To permit effectuation of heat exchange control, the embodiment illustrated in FIGS. 1 and 2 shows a baffle 25 inserted in the outlet conduit 16. This baffle 25 is in well-known manner responsive to the temperature of the first heat exchange medium, or rather to fluctuations in such temperature, and is operative for permitting entry of the required quantity of the heat exchange medium into the heat exchanger 17 in dependence upon such temperature fluctuations. A more detailed description of the construction and operation of the baffle 25 is not believed it will control the entry of fresh heat exchange medium necessary since this is well known to those skilled in the art. It will be evident that the baffle 25 can be provided in the inlet conduit 18 instead, if so desired, in which case from the heat exchange 17 into the chamber 10a. Again, it can be responsive to the temperature of the heat exchange medium.

It is clear that a variety of modifications are readily possible, and that they will be clearly evident to those skilled in the art. All such modifications are intended to be encompassed by the protection sought with the appended claims. It is also clear that with the present construction the configuration, construction and, to some extent, positioning of the heat exchanger 17 is entirely a matter of choice and is in no way influenced or dictated by the construction or configuration of the reactor itself. This results in significant savings, permits separate transportation of the reactor and the heat exchanger, if necessary, facilitates positioning of the two components, and makes for an arrangement which is much improved over what is known in the prior art.

It will be understood that each of the elements described above, or two or more together, may also find a useful application in other types of reactors differing from the types described above.

While the invention has been illustrated and described as embodied in a catalytic reactor, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this inven-

What is claimed as new and desired to be protected by Letters Patent is set forth in the appended claims.

We claim:

1. A catalytic reactor comprising, in combination, a housing defining an inner chamber having an inlet and an outlet for a first heat-exchange medium; circulating means arranged centrally of said chamber and operative for circulating said first medium through said chamber; a plurality of pipes disposed within said chamber exposed to said first medium, said pipes being adapted to convey a second heat-exchange medium through said chamber and being arranged in a plurality of groups adjacent ones of which define with one another unobstructed passages for said first medium; and conduit means arranged in one of said passages and connecting said inlet and said outlet with said circulating means so that fresh first medium entering said inlet is conveyed by said conduit means to said circulating means, and spent first medium is conveyed by said conduit means from said circulating means to said outlet.

2. A reactor as defined in claim 1, wherein said one passage has a width exceeding the width of the remaining passages.

3. A reactor as defined in claim 1, wherein said chamber is of substantially circular cross-section, and wherein said passages extend in substantially radial direction.

4. A reactor as defined in claim 2, wherein said housing is upright and said chamber has a top region and a bottom region, said pipes extending from said top region to said bottom region and said radially extending passages being unobstructed intermediate said top and bottom region.

5. A reactor as defined in claim 2, wherein said conduit means comprises an inlet conduit communicating with said inlet and said circulating means, and an outlet conduit communicating with said outlet and said circulating means.

6. A reactor as defined in claim 5 and further comprising flow regulating means provided in at least one of said conduits for regulating the flow of said first medium therethrough.

7. A reactor as defined in claim 6, wherein said flow regulating means is temperature-responsive and operative for regulating the flow of said first medium in automatic response to a variation of predetermined magnitude in the temperature of said first medium.

8. A reactor as defined in claim 5, wherein one of said conduits is arranged in said one passage in the top region of said chamber, and the other of said conduits is arranged in said one passage in the bottom region of said chamber.

9. A reactor as defined in claim 8, wherein said one conduit is said inlet conduit, and wherein said other conduit is said outlet conduit.

References Cited

UNITED STATES PATENTS

| | | | |
|---|---|---|---|
| 1,909,358 | 5/1933 | Jaeger | 23—288 |
| 1,945,812 | 2/1934 | Jaeger | 23—288 |
| 2,098,148 | 11/1937 | Jarl | 23—288 |

ROGERT A. O'LEARY, *Primary Examiner.*

A. W. DAVIS, *Assistant Examiner.*

U.S. Cl. X.R.

165—40, 107, 108, 159